United States Patent [19]

Lytwynec

[11] Patent Number: 4,904,537

[45] Date of Patent: Feb. 27, 1990

[54] COPPER-LEAD COMPOSITE BEARING MATERIAL HAVING FINE LEAD SIZE AND METHOD OF PRODUCING SAME

[75] Inventor: Michael D. Lytwynec, Brighton, Mich.

[73] Assignee: Federal-Mogul Corporation, Southfield, Mich.

[21] Appl. No.: 110,642

[22] Filed: Oct. 14, 1987

Related U.S. Application Data

[63] Continuation of Ser. No. 829,471, Feb. 13, 1986, abandoned, which is a continuation of Ser. No. 555,778, Nov. 28, 1983, abandoned.

[51] Int. Cl.⁴ .............................................. B22F 7/100
[52] U.S. Cl. ...................................... 428/548; 419/25; 419/26; 419/47; 419/54; 419/5; 419/24; 419/28; 419/29; 428/546; 252/12.2
[58] Field of Search .............................. 428/545–555; 419/8, 24, 25, 27–29, 47, 53–57; 29/149.5 PM; 427/190, 191, 192, 202, 203, 205, 376.4; 75/251, 950; 252/12

[56] References Cited

U.S. PATENT DOCUMENTS

| | | |
|---|---|---|
| 2,040,053 | 5/1936 | Lytle . |
| 2,280,103 | 4/1942 | Swartz et al. . |
| 2,635,020 | 4/1953 | Beebe, Jr. ............................ 308/237 |
| 2,970,933 | 2/1961 | Barera et al. ......................... 117/71 |
| 2,986,464 | 5/1961 | Lewis et al. ............................. 419/8 |
| 3,078,563 | 2/1963 | Gould et al. .......................... 29/494 |
| 3,154,844 | 11/1964 | Sayre et al. .......................... 29/420 |
| 3,305,325 | 2/1967 | LeBrasse et al. ................... 29/182.3 |
| 3,376,183 | 4/1968 | Flynn et al. ......................... 156/244 |
| 3,445,909 | 5/1969 | Beebe, Jr. ........................... 29/149.5 |
| 3,730,705 | 5/1973 | Latrobe . |
| 4,002,472 | 1/1977 | Le Brasse et al. ...................... 419/8 |
| 4,189,522 | 2/1980 | Mori ................................... 428/557 |
| 4,200,541 | 4/1980 | Kinner et al. ...................... 252/12.2 |
| 4,206,268 | 6/1980 | Roemer et al. . |
| 4,406,857 | 9/1983 | Mahrus et al. . |

FOREIGN PATENT DOCUMENTS

| | | | |
|---|---|---|---|
| 473363 | 6/1977 | Japan .............................. 252/12.2 |
| 2069007 | 7/1981 | United Kingdom ............... 428/548 |
| 2084186 | 8/1981 | United Kingdom . |

*Primary Examiner*—Barry S. Richman
*Assistant Examiner*—T. J. Wallen
*Attorney, Agent, or Firm*—Lawrence J. Shurupoff; Robert F. Hess

[57] ABSTRACT

An improved process and an improved composite bearing material produced thereby comprising a hard metal backing strip having leaded-bronze bearing lining tenaciously bonded to at least one face surface thereof and wherein the bearing lining is characterized by having the lead constituent thereof substantially uniformly distributed throughout the lining matrix in the form of extremely fine-sized particles providing improved operating characteristics to the bearing materials fabricated therefrom. In accordance with the process aspects of the present invention, the steel backing strip is provided with a metallic plating composed predominantly of nickel to at least the face on which a preallyed leaded-bronze powder of a controlled composition is applied and is thereafter sintered at a controlled temperature for a short period of time sufficient to effect a liquid phase sintering of the powder together and the formation of a bond between the powder layer and the metallic plating on the face of the backing strip whereafter the sintered composite strip is cooled and is compacted usually at temperatures below about 300° F. to effect a substantially complete densification of the powder layer. The composite strip is again reheated at a controlled temperature and for a brief period of time sufficient to further enhance the physical properties of the bearing lining and to further enhance the strength of the bond between the lining and backing strip under controlled conditions to inhibit growth of the fine-sized lead particles into undesirable larger particles. The composite strip is thereafter again cooled and may be subjected to a further compaction at moderate warm temperatures to achieve still further densification and to improve the physical properties and sizing of the composite strip.

21 Claims, No Drawings

COPPER-LEAD COMPOSITE BEARING MATERIAL HAVING FINE LEAD SIZE AND METHOD OF PRODUCING SAME

CROSS-REFERENCE TO RELATED APPLICATION

This application is a continuation of application Ser. No. 829,471, filed Feb. 13, 1986, now abandoned, which was a continuation of application Ser. No. 555,778, filed Nov. 28, 1983, also abandoned.

This present application is closely related in subject matter pertaining to the bearing material to copending application Ser. No. 868,236 filed May 28, 1986, now abandoned, and the continuation application filed therefrom having Ser. No. 015,591, filed Feb. 17, 1987, and having issued as U.S. Pat. No. 4,818,628 on Apr. 4, 1989.

BACKGROUND OF THE INVENTION

The present invention broadly relates to composite bearing materials which are comprised of a hard metal backing strip, such as steel, having a bearing lining composed of leaded bronze tenaciously bonded to at least one face surface thereof. Such composite bearing materials are eminently suitable and in widespread use for the fabrication of various bearing components for use in internal combustion engines, vehicle suspensions, transmission assemblies or the like.

Composite bearing materials of the foregoing general type have been produced by processes such as disclosed in U.S. Pat. No. 2,986,464 granted May 30, 1961 to Lewis et al and U.S. Pat. No. 4,002,472 granted Jan. 11, 1977 to LeBrasse et al which are also assigned to the assignee of the present invention. The teachings of the two aforementioned United States patents, to the extent that they are relevant to the present invention, are incorporated herein by reference.

While the processes disclosed and the resultant composite bearing material produced in accordance with the processes described in the aforementioned United States patents are eminently suitable for producing high quality composite bearing materials for the fabrication of various bearing components, less than optimum physical properties of the bearing lining and performance of the bearing components produced therefrom have been obtained due to the presence of relatively large-sized lead particles in the bearing lining. Attempts to overcome this problem by the direct casting of a molten leaded-bronze bearing alloy directly on a steel backing strip has been unsuccessful in overcoming this problem.

The present invention provides for an improved process and an improved composite bearing material produced thereby employing powder metallurgical techniques whereby a satisfactory tenacious bond is obtained between the bearing lining and the steel backing strip employing sintering conditions including time and temperature which inhibit the formation of large-sized lead particles thereby achieving a unique leaded-bronze lining characterized by an extremely fine-sized lead distribution dispersed uniformly throughout the bearing lining matrix.

SUMMARY OF THE INVENTION

The benefits and advantages of the present invention are achieved in accordance with the process aspects thereof, by providing a steel backing strip to at least one face surface of which a metallic plating, preferably a substantially pure nickel plating is applied at a thickness of at least about 40 millionths of an inch. A prealloyed leaded-bronze powder of an average particle size generally less than about 147 microns is thereafter applied on the metallic plating and the strip and superimposed powder layer is heated to a temperature of from about 1450° F. to about 1600° F., typically about 1500° F. for a period of time sufficient to effect a liquid phase sintering of the powder particles together and a bonding of the powder layer to the face of the strip. The sintered strip thereafter is cooled and is subjected to compaction such as by roll compaction in a manner to effect a substantially complete densification of the metal powder layer whereafter the compacted composite strip is reheated to a temperature of about 1450° to about 1600° F. for an additional period of time to further enhance the physical properties of the lining and to further enhance the bond between the lining and the backing strip. Thereafter, the resintered composite strip is cooled to a temperature below about 800° F. in a protective atmosphere and preferably, is again subjected to a warm compaction, typically at a temperature of about 300° to about 450° F. such as by roll compaction to further enhance the properties of the composite strip and to improve the sizing characteristics thereof.

The resultant composite strip can subsequently be employed for fabrication of various bearing components and the outer face of the lining can be machined to final dimensions. It is further contemplated that the machined outer face of the bearing lining can be subjected to an overplate of a suitable bearing metal or metal alloy such as a lead-tin-copper bearing alloy containing up to about 90 percent by weight lead.

In accordance with the product aspects of the present invention, the bearing lining of the composite bearing material is characterized as having a nickel-rich phase at the interface of the bond between the backing strip and the bearing lining resulting from the interdiffusion of the nickel plating on the bearing strip during the sintering and compaction steps. The bearing lining itself nominally contains about 8 percent to about 35 percent lead, up to about 10 percent tin with the balance consisting essentially of copper. The bearing lining matrix is further characterized by the fact that the lead constituent thereof is substantially uniformly distributed throughout the lining matrix in the form of fine-sized particles of an average particle size typically less than about 8 microns at a distribution frequency ranging from about 2,000 to about 3,100 particles per square millimeter.

Additional benefits and advantages of the present invention will become apparent upon a reading of the Description of the Preferred Embodiments taken in conjunction with the specific examples provided.

DESCRIPTION OF THE PREFERRED EMBODIMENTS

The composite bearing material in accordance with a preferred practice of the present invention is comprised of a low-alloy steel such as SAE Type 1010 or 1020 generally having a thickness of from about 0.040 up to about 0.250 inch. After appropriate preliminary cleaning steps to remove residual dirt, scale and oxide from the face surfaces of the steel strip, the strip is subjected to a plating operation to deposit a substantially uniform and continuous metal plating composed predominantly of nickel on the face surface thereof generally of a thickness of at least about 40 millionths of an inch, and preferably at least about 60 millionths of an inch. While thicknesses greater than about 100 millionths of an inch can be employed, such greater thicknesses do not appear to provide any substantial benefits in the bond strength between the lining and the backing strip and the use of such greater thicknesses is undesirable for economic considerations.

The metal powder employed in forming the bearing lining by powder metallurgical techniques comprises a copper-lead-tin prealloyed powder which may generally contain from about 8 percent to about 35 percent lead, up to about 10 percent tin with the balance consisting essentially of copper. The use of the powder in a prealloyed form is important to achieve the unique distribution of the lead constituent in the final bearing lining. While it is preferred to employ prealloyed powders wherein each particle thereof is of the same composition as that of the final bearing lining desired, it is contemplated that prealloyed powders of alternative compositions can be mixed together to provide a resultant mixture corresponding to that of the final bearing lining. Typical of leaded-bronze alloys that can be satisfactorily employed in the practice of the present invention are SAE Grade 797, nominally composed of 80 percent copper, 10 percent lead, 10 percent tin; SAE Grade 798, nominally containing 88 percent copper, 8 percent lead and 4 percent tin; SAE Grade 799, nominally containing 73.5 percent copper, 23 percent lead and 3.5 percent tin; SAE Grade 49, nominally containing 75.5 percent copper, 24 percent lead and 0.5 percent tin; SAE Grade 480, nominally composed of 64.5 percent copper, 35 percent lead and 0.5 percent tin. Particularly satisfactory results have been obtained for heavy-duty bearing linings produced in accordance with the practice of the present invention employing prealloyed powders containing about 80.5 percent to about 83.5 percent copper, about 13 to about 16 percent lead and about 3.5 percent tin.

The shape of the prealloyed powder particles is not critical although particles of a generally spherical configuration are preferred. The particle size of the prealloyed powder should be less than about 100 mesh (147 microns) with particle sizes ranging to as small as about 1 micron. In accordance with a preferred practice, the prealloyed metal powder contains particles distributed over the permissible size range with 50 percent thereof being less than 325 mesh (44 microns) whereby optimum loose powder packing density is achieved. The loose powder density as applied to the metal plated backing strip generally ranges from about 50 percent to about 60 percent of 100 percent theoretical density. The quantity of powder applied will vary depending upon the specific type of bearing component to be fabricated from the composite bearing material and generally will range from about 0.020 to about 0.070 inch whereby upon subsequent sintering and compaction, the final lining will range in thickness from about 0.010 to about 0.050 inch.

The steel backing strip which is usually supplied in the form of a coil, is subjected to appropriate cleaning such as vapor degreasing, alkaline or acidic cleaning, wire brushing, acid pickling as may be required to remove surface soils and any rust and/or scale on the face surfaces thereof providing a typical pretreatment prior to the nickel electroplating step. The cleaned steel backing strip is thereafter subjected to a nickel electroplating operation wherein a metal plating composed predominantly of nickel is applied to at least one face surface of the backing strip to which the bearing lining is subsequently to be applied. The electroplating step can be performed employing any one of a variety of electrolytes well known in the art including a typical Watts-type nickel plating bath to provide a metal plating of at least about 40 millionths of an inch thick and preferably, about 60 millionths of an inch or thicker. Metal platings substantially in excess of about 100 millionths of an inch have been found not to appreciably affect the bond strength between the lining and backing strip and the use of metal platings of such greater thickness is generally unnecessary and undesirable because of economic considerations.

The resultant electroplated steel strip is advanced in a substantially horizontal position beneath a suitable feed hopper containing the prealloyed leaded-bronze powder which is applied in the form of a substantially uniform layer as controlled by a doctor knife or the like. The strip with the superimposed powder layer thereon thereafter enters a first sintering furnace provided with a nonoxidizing atmosphere which is heated to a temperature ranging from about 1450° up to about 1600° F. The nonoxidizing atmosphere preferably comprises a reducing atmosphere derived from the incomplete combustion of natural gas nominally containing about 12 percent hydrogen, 10 percent carbon monoxide and 5 percent carbon dioxide with the balance consisting essentially of nitrogen. The use of a reducing atmosphere provides the further advantage of reducing any oxides present on the surfaces of the powder particles and to prevent any further oxidation thereof at the elevated sintering temperatures encountered in the sintering furnace.

The specific temperature employed in the sintering furnace will vary somewhat depending upon the particular composition of the prealloyed powder and is adjusted to produce a sufficient liquid phase comprised predominantly of lead which effects a wetting of the powder particles and a filling of the interstices present in the powder layer in addition to a wetting of the surface of the nickel plating on the steel strip to promote the formation of a tenacious bond. Generally, sintering temperatures below about 1450° F. are unsatisfactory due to the failure to form an appreciable bond between the powder layer and the backing strip whereas temperatures in excess of about 1600° F. are also unsatisfactory due to the formation of an excessive amount of liquid phase. Preferably, the sintering temperature is controlled at about 1500° F. for a period of about 3 to about 5 minutes at the sintering temperature.

At the conclusion of the sintering operation, the composite strip exits from the sintering furnace and enters a suitable cooling section provided with a nonoxidizing protective atmosphere in which it is cooled to a temperature below about 300° F. whereafter the strip is compacted to substantially 100 percent of theoretical density to reduce any residual voids in the powder layer. The compaction can conveniently be achieved by passing the strip through a pair of compaction rolls.

Following the roll compaction step, the composite strip is again reheated in a furnace provided with a nonoxidizing, preferably, reducing atmosphere to a temperature within the same range as the first sintering temperature and preferably about 1500° F. for a total residence period of about 10 minutes including a preheating period to provide a sintering time at temperature of about 3 to about 5 minutes to effect a further enhancement of the bond between the bearing lining and the nickel plated steel backing strip and a further improvement in the physical characteristics of the bearing lining. Following the reheating or second sintering operation, the steel strip is cooled in a protective atmosphere, preferably by passing the strip through a molten lead bath at a temperature of about 800° F. which effects a further filling of any residual pores present in the bearing lining. Upon further cooling, preferably to a temperature within the range of about 300° to about 450° F., the cooled composite strip is subjected to a further final compaction, preferably a warm roll compaction step to provide for still further improvements in the properties of the composite strip and to effect a sizing and improved uniformity of the bearing lining thereon.

The resultant composite strip can thereafter readily be coiled and transferred to further fabricating operations to fabricate bearing components such as shell-type bearings, bushings, thrustwashers, and the like.

Following the bearing component fabrication step, the face of the bearing lining is usually subjected to a further final finishing operation to provide a precision bearing component. Optionally, and preferably, the machined bearing surface can be provided with an overplate of a suitable soft metal bearing lining of any of the types well known in the art. In accordance with a preferred practice of the present invention, the machined bearing face is electroplated to provide a nickel barrier layer on the lining surface of a thickness of at least about 30 millionths of an inch whereafter a suitable overplate is applied at a thickness of about 0.0005 to about 0.0015 inch. A bearing alloy particularly suitable as an overplate nominally contains about 2 to about 4 percent copper, about 8 to about 12 percent tin with the balance consisting essentially of lead.

In accordance with the process as hereinbefore described, the bearing lining is characterized by the lead constituent thereof being present in the form of extremely fine-sized particles substantially uniformly distributed throughout the lining matrix from the bearing face inwardly to the backing strip. The lead particles are further characterized as being of an average particle size typically less than about 8 microns distributed at a frequency ranging from about 2,000 to about 3,100 particles per square millimeter. The extremely fine size of the lead particles and their substantially uniform distribution throughout the lining matrix renders such linings eminently suitable for heavy duty-type bearing applications due to the improved physical properties of such bearing linings in comparison to conventional prior art bearing linings of similar alloy composition in which the lead particles are of substantially greater size and/or of nonuniform distribution. The fine-sized particles are achieved in accordance with the specific conditions employed in the sintering and reheating steps of the process which substantially inhibits an agglomeration of the lead constituent into undesirable larger particles in accordance with prior art practices.

In order to further illustrate the process of the present invention, the following specific examples are provided. It will be understood that the examples are provided for illustrative purposes and are not intended to be limiting of the scope of the present invention as herein defined and as set forth in the subjoined claims.

EXAMPLE 1

A SAE type 1010 steel test strip 6 inches by 2 inches of 0.075 inch thick was cleaned by conventional procedures and was electroplated in a Watts-type nickel plating bath to produce a nickel plate of about 0.08 mils thick. A prealloyed leaded-bronze powder containing about 15 percent by weight lead, about 3 percent tin and the balance copper of an average particle size of about minus 100 mesh was applied to one face of the nickel plated test strip to a thickness of about 0.047 inch and the powder layer and strip were placed in a sintering furnace at about 1490° F. for a total residence time of about 10 minutes including a preheating period and a sintering period of about 3–5 minutes under an exothermic reducing atmosphere to effect a preliminary sintering of the powder layer. Thereafter, the strip was cooled to room temperature (70° F.) and densified by passing through a roll compactor to compact the powder layer to about 0.023 inch. The compacted composite test strip was reheated in the same furnace to a temperature of about 1490° F. for an additional period of about 10 minutes including a preheating to temperature and final sinter at temperature of about 3 to about 5 minutes whereafter it was removed and cooled to room temperature.

A section of the composite strip was evaluated for bond strength of the lining to the backing strip and was found by test to be about 10,400 psi bond-shear strength. A microscopic inspection of the cross-section of the lining revealed an extremely fine-sized and uniform distribution of the lead particles from the surface to the steel interface.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A composite bearing material comprising a steel backing strip having a leaded-bronze bearing lining tenaciously bonded to at least one face thereof, said composite bearing material further characterized as having a phase composed predominantly of nickel interfacing the bond between said backing strip and said bearing lining, said bearing lining being substantially fully dense and containing about 8 percent to about 35 percent lead, up to about 10 percent tin and the balance essentially all copper, said bearing lining further characterized by the lead constituent thereof being substantially uniformly distributed throughout the bearing lining in the form of fine-sized lead particles having an average size less that about 8 microns.

2. The composite bearing material as defined in claim 1 in which said lead particles are present in said bearing lining at a frequency ranging from about 2,000 to about 3,100 per square millimeter.

3. A process for making a composite bearing material comprising a steel backing strip having a leaded-bronze bearing lining tenaciously bonded to at least one face thereof which comprises the steps of:
providing a steel backing strip,
depositing a metal plating composed predominantly of nickel to at least one surface of said backing strip,
depositing a layer of a prealloyed leaded-bronze powder atop said metal plating, heating the prealloyed powder layer and said backing strip to a temperature of about 1450° to 1600° F. in a non-oxidizing atmosphere for a period of time no greater than sufficient to effect a liquid phase sintering of the powder and the formation of a bond between said powder layer and said face of said backing strip, cooling said layer and strip to a temperature below about 300° F., compacting the cooled said layer to effect a substantially complete densification of said powder layer, reheating the compacted said layer and strip to a temperature of about 1450° to 1600° F. to effect a further improvement in the physical properties of the compacted said layer and an increase in the strength of said bond between said layer and said face of said strip, and thereafter, cooling the composite strip in a protective environment to a temperature below about 800° F., whereby the lead particles finally formed are of an average size less than about 8 microns and are uniformly distributed throughout said layer.

4. The process as defined in claim 3 in which the step of heating the prealloyed powder is performed for a period of time of about 3 to 5 minutes at said temperature of about 1450° to 1600° F.

5. The process as defined in claim 3 in which the step of heating the prealloyed powder is performed to further minimize agglomeration of the metallic lead constituents therein.

6. The process as defined in claim 3 in which the step of reheating the compacted said layer is performed for a period of about 3 to 5 minutes at said temperature of about 1450° to 1600° F. and for a total heat period of no more than about 10 minutes.

7. The process as defined in claim 3 in which the step of reheating the compacted said layer is performed at a temperature of about 1500° F.

8. The process as defined in claim 3 in which the step of cooling the composite strip is performed by passing said composite strip through a molten metallic bath containing lead.

9. The process as defined in claim 3 including the further step of subjecting the cooled composite strip to a second compaction at a temperature below about 800° F.

10. The process as defined in claim 9 in which said second compaction is performed at a temperature of about 300° to 450° F.

11. The process as defined in claim 9 in which said second compaction is performed by roll compaction.

12. The process as defined in claim 3 in which said metal plating composed predominantly of nickel is applied at an average thickness of at least about 40 millionths of an inch and generally less than about 100 millionths of an inch.

13. The process as defined in claim 3 in which said metal plating is applied at an average thickness of at least about 60 millionths of an inch.

14. The process as defined in claim 3 in which said metal plating comprises substantially pure nickel.

15. The process as defined in claim 3 in which said prealloyed powder contains about 8 to 35 percent lead, up to about 10 percent tin and the balance essentially copper.

16. The process as defined in claim 3 in which said prealloyed powder contains about 13 to 16 percent lead, about 3 to 4 percent tin and the balance essentially copper.

17. The process as defined in claim 3 in which said prealloyed powder is of an average particle size less than about 147 microns.

18. The process as defined in claim 3 in which said prealloyed powder is of an average particle size less than about 147 microns with about 50 percent thereof of a particle size less than about 44 microns.

19. A composite bearing material produced by the process as defined by claim 3.

20. A process for making a composite bearing material comprising a steel backing strip having a leaded-bronze bearing lining tenaciously bonded to at least one face thereof which comprises the steps of:

providing a steel backing strip, depositing a metal plating composed predominantly of nickel to at least one face of said backing strip at an average thickness of at least about 40 millionths of an inch and generally less than about 100 millionths of an inch, depositing a layer of a prealloyed leaded-bronze powder atop said metal plating, said prealloyed powder containing about 8 to 35 percent lead, up to about 10 percent tin and the balance essentially copper, heating the prealloyed powder layer and said backing strip to a temperature of about 1450° to 1600° F. in a non-oxidizing atmosphere and holding said prealloyed powder layer and backing strip at said temperature for a period of time of about 3 to 5 minutes to effect a liquid phase sintering of the prealloyed powder and the formation of a bond between said prealloyed powder layer and said face of said backing strip, cooling said prealloyed powder layer and backing strip to a temperature below about 300° F., compacting the cooled said prealloyed powder layer to effect a substantially complete densification of said prealloyed powder layer, reheating the compacted said prealloyed powder layer and backing strip to a temperature of about 1450° to 1600° F. and for a total reheat period of no more than about 10 minutes to effect a further improvement in the physical properties of the compacted said prealloyed powder layer and an increase in the strength of said bond between the compacted said prealloyed powder layer and said face of said backing strip, and thereafter, cooling the composite strip of prealloyed powder layer and backing strip in a protective environment to a temperature below about 800° F., whereby the lead particles finally formed are of an average size less than about 8 microns and are uniformly distributed throughout said prealloyed powder layer in an amount of approximately 2000–3100 particles per square millimeter.

21. The process as defined in claim 20 in which said prealloyed powder is of an average particle size less than about 147 microns in diameter with about 50 percent thereof of a particle size less than about 44 microns in diameter and said prealloyed powder having a generally spherical particle shape and each particle being of substantially uniform alloy composition with all other particles of said prealloyed powder and being applied to said backing strip as a layer about 0.020–0.070 inches thick.

* * * * *